US006742537B2

(12) United States Patent
Martus et al.

(10) Patent No.: US 6,742,537 B2
(45) Date of Patent: Jun. 1, 2004

(54) COMBINATION SOLENOID OPERATED FLOW CONTROL AND SHUT-OFF VALVE WITH PRESSURE TRANSDUCER

(75) Inventors: Charles R. Martus, Oxford, MI (US); Janet L. Hawkins, New Baltimore, MI (US); Gerrit V. Beneker, Algonac, MI (US)

(73) Assignee: Eaton Corporation, Cleveland, OH (US)

( * ) Notice: Subject to any disclaimer, the term of this patent is extended or adjusted under 35 U.S.C. 154(b) by 17 days.

(21) Appl. No.: 10/195,335

(22) Filed: Jul. 16, 2002

(65) Prior Publication Data

US 2004/0011409 A1 Jan. 22, 2004

(51) Int. Cl.[7] ................................................ F16K 37/00

(52) U.S. Cl. .............................. 137/15.18; 137/315.03; 137/614.27; 137/312; 137/557; 73/49.7; 123/520

(58) Field of Search ............................. 73/40.5 R, 49.2, 73/49.7, 46; 137/312, 557, 315.03, 15.18, 614.21; 123/519, 520

(56) References Cited

U.S. PATENT DOCUMENTS

| | | | | | |
|---|---|---|---|---|---|
| 4,703,737 | A | * | 11/1987 | Cook et al. ................. | 123/520 |
| 5,146,902 | A | * | 9/1992 | Cook et al. ................. | 123/518 |
| 5,297,529 | A | * | 3/1994 | Cook et al. ................. | 123/520 |
| 5,411,004 | A | * | 5/1995 | Busato et al. ............... | 123/520 |
| 5,637,788 | A | | 6/1997 | Remboski et al. ........... | 73/40.5 |
| 6,158,270 | A | * | 12/2000 | Garman et al. .............. | 73/40.7 |
| 6,247,456 | B1 | * | 6/2001 | Everingham et al. ....... | 123/520 |

* cited by examiner

*Primary Examiner*—A. Michael Chambers
(74) *Attorney, Agent, or Firm*—Roger A. Johnston

(57) ABSTRACT

A combination solenoid operated flow control valve and solenoid operated by-pass valve and pressure transducer are disposed in a common housing with a common electrical receptacle for connection thereto. The pressure transducer senses differential pressure across a metering orifice. The pressure transducer measures flow through the metering orifice during leak testing. A vacuum is drawn in the system for leak testing. The by-pass valve is opened to bypass the metering orifice and permit full flow to the flow control valve during normal engine operation.

20 Claims, 4 Drawing Sheets

COMBINATION SOLENOID OPERATED FLOW CONTROL AND SHUT-OFF VALVE WITH PRESSURE TRANSDUCER

BACKGROUND OF THE INVENTION

The present invention relates to electrically operated valves and particularly to such valves employed in low voltage operation as, for example, the 12 volt supply employed in on-board motor vehicle applications. More particularly, the invention relates to solenoid operated valves employed in controlling fuel tank vapor emission in motor vehicles and in such applications where it is required to provide the diagnostic leak test of the vapor emission control system. Present systems of this type commonly employ a canister filled with adsorbent such as granulated carbonaceous material for storing fuel vapor during engine shutdown.

Recent legislation has mandated on-board leak testing of fuel vapor emission control systems and this has resulted in the requirement to close the atmospheric air inlet to the fuel vapor storage device or charcoal canister during the leak test cycle. Typically, in motor vehicles having such a canister, an electrically operated valve is employed to control the flow of fuel vapor from the canister to the engine air inlet during engine operation, which flow control is particularly critical during engine idle.

In order to comply with requirements for on-board leak detection diagnostic systems, it has been proposed to measure the flow rate of vapor when the vapor pressure in the tank is equal to the atmospheric pressure or in other words the $\Delta P$ across the tank wall is zero and compare with a flow measurement taken when a vacuum is pulled upon the tank with the canister vent valve closed. An example of such a known system for on-board leak detection of the fuel vapor emission control system is that shown and described in U.S. Pat. No. 5,637,788 issued to D. J. Remboski, et al. The diagnostic system in the aforesaid patent utilizes a pressure sensor mounted through the upper tank wall end a separate electrically operated flow regulation valve controls the flow of vapor to the engine during engine operation and for measuring the flow during the diagnostic test. The aforesaid diagnostic system employs a pressure sensor and an electrically operated flow control valve which are in addition to a separate electrically operated atmospheric vent valve controlling air flow into the vapor storage canister. In the aforesaid known fuel vapor emission control diagnostic system the pressure sensor and electrically operated valves are controlled by an electronic controller. This arrangement requires separate wiring to each of the valves and the sensor from the controller and thus increases the cost of assembly of the vehicle and complicates the assembly and creates additional sources of potential failure due to the complexity of routing separate wires around the tank at installation on the vehicle.

It has thus been desired to provide a way or means of on-board diagnostic testing of the fuel tank vapor emission control system in a manner which is simple, easy to install, low in cost and sufficiently robust to withstand continued exposure to the in service environment of the vehicle.

BRIEF SUMMARY OF THE INVENTION

The present invention provides an electrically operated set of valves including a flow control orifice and differential pressure sensing transducer combined as a single unit in a common housing for use in controlling flow of fuel tank vapor emission to an engine air inlet and for use in on-board vehicle diagnostic testing for leakage in the vapor emission control system. The combination valve and pressure transducer assembly of the present invention includes electrical terminals for attachment of a single electrical connector thereto for simplifying the wiring harness in the vehicle and provides for a single location of mounting the valve assembly for connection to the fuel vapor storage canister and to the engine air inlet. The combination valve and pressure transducer of the present invention thus reduces the number of wires and hoses and simplifies installation. During engine operation one valve is opened to bypass a metering orifice across which the pressure transducer measures flow during leak testing under vacuum. The present invention thus combines the functions of fuel vapor flow control and diagnostic testing including flow measurement into a single unit which may be mounted remotely from the fuel tank. The combination valve and transducer assembly of the present invention utilizes a robust common housing for all of the components and provides for improved reliability and resistance to harsh environments encountered during vehicle service.

DETAILED DESCRIPTION OF THE INVENTION

Figure 1:
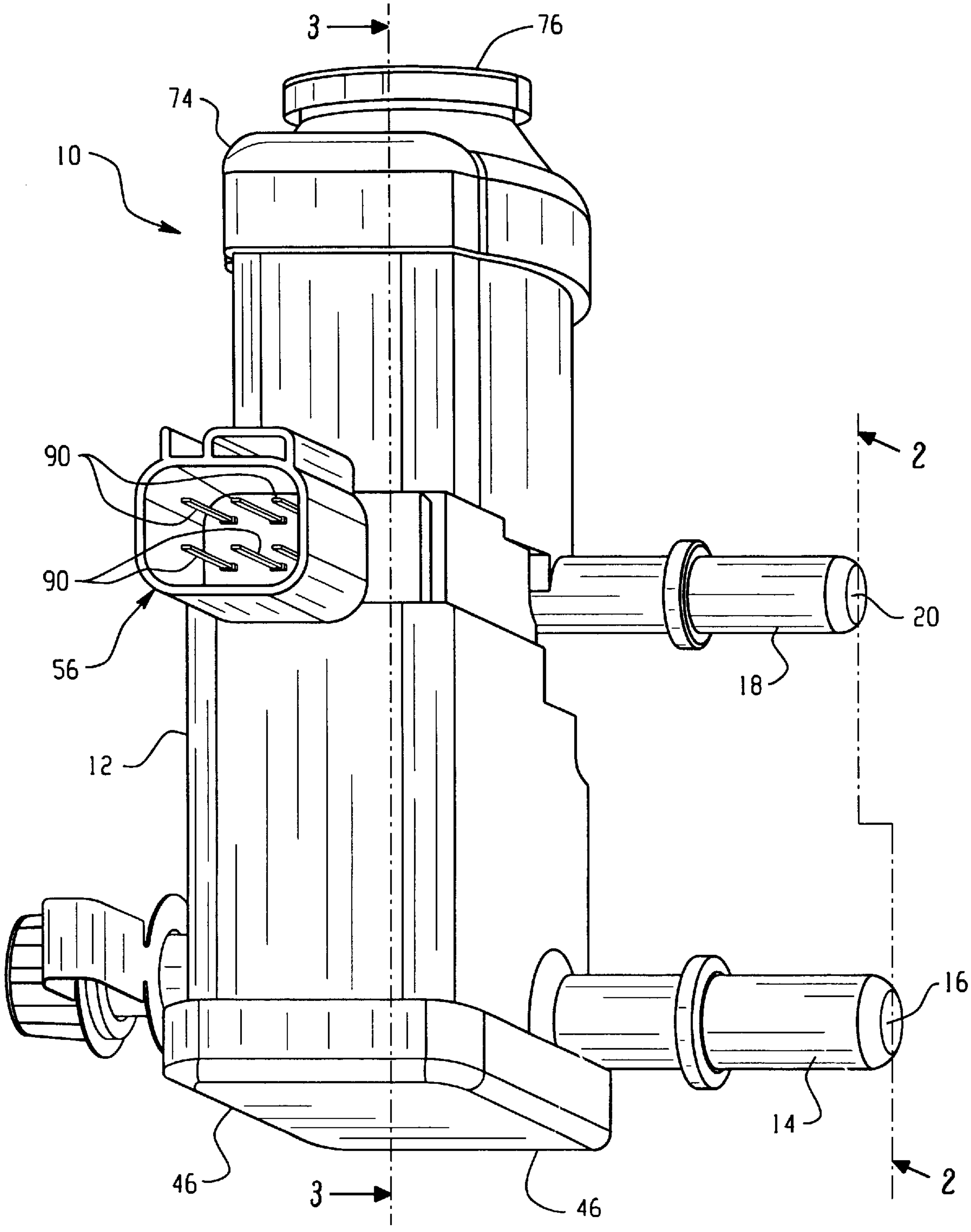
FIG. 1 is an axonometric view of the assembly of the present invention.

Referring to the drawings, assembly of the present invention is indicated generally at 10 and includes a housing or body 12 preferably formed integrally as one piece having an elongated hollow configuration with an inlet fitting 14 formed at one end thereof having an inlet passage 16 therethrough and an outlet fitting 18 spaced from the inlet fitting and having an outlet passage 20 formed therethrough. Inlet passage 16 communicates with a first valving chamber 22 formed in the interior of the housing 12 and has a solenoid operator indicated generally at 24 disposed therein which has a preferably encapsulated coil 26 with a moveable armature 28 disposed therein having an operating member or rod 30 extending therefrom which has a valve obturator or poppet member 32 provided on the end thereof for movement therewith.

A valve seat member 34 is provided in the chamber 22 and has an annular valve seat 36 formed thereon which surrounds a passage 38 which communicates with a passage 40 formed in a second valve seat member 42 which has an annular valve seat 44 formed in the end thereof remote from valve seat 36.

Solenoid operator 24 is retained in the valving cavity 22 in the body 12 by a cap 46 which may be sealingly attached over the lower end of the body by any suitable expedient as, for example weldment by sonic welding or spin welding.

Figure 2:
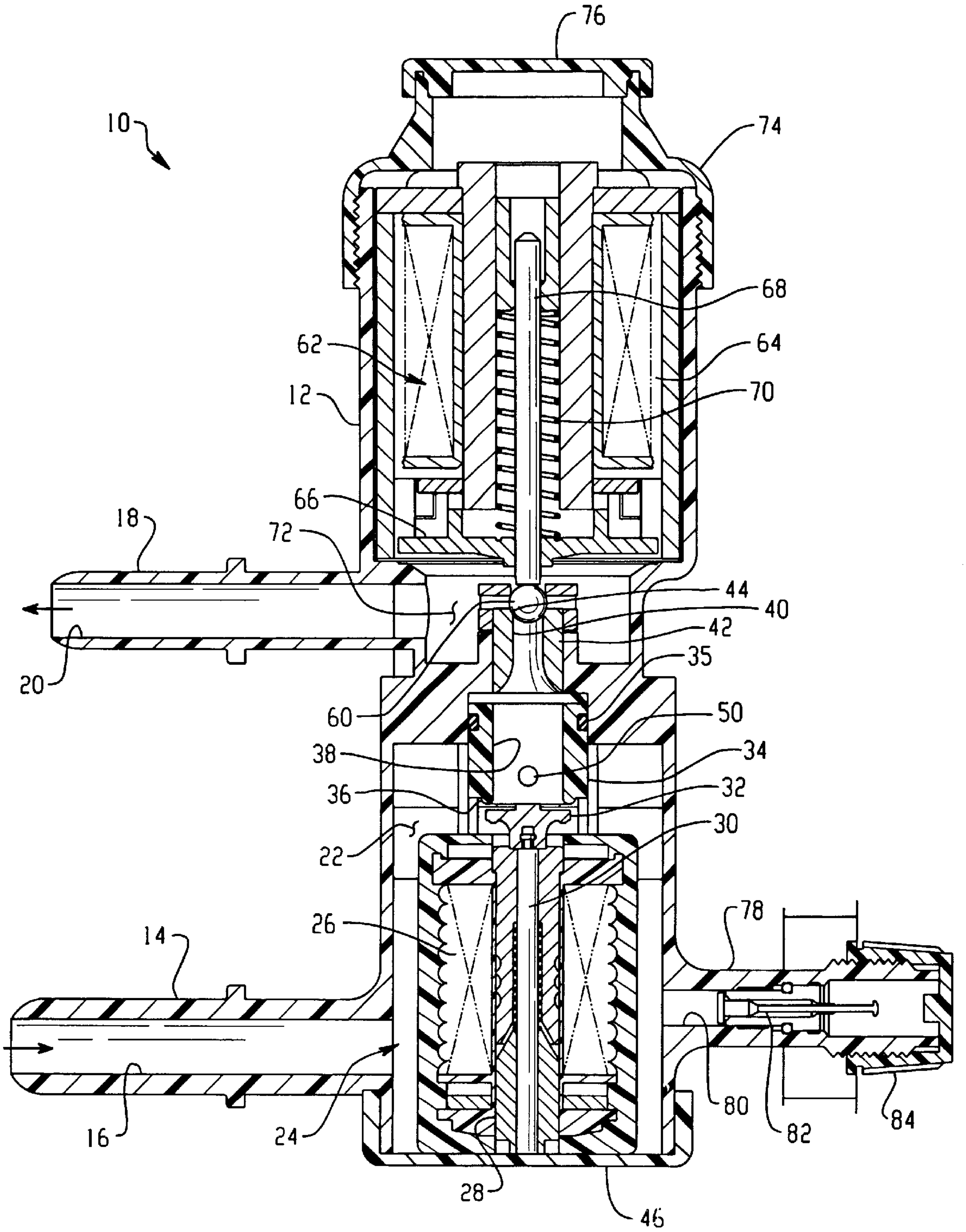
FIG. 2 is a section view taken along section indicating lines 2—2 of FIG. 1.
Figure 3:
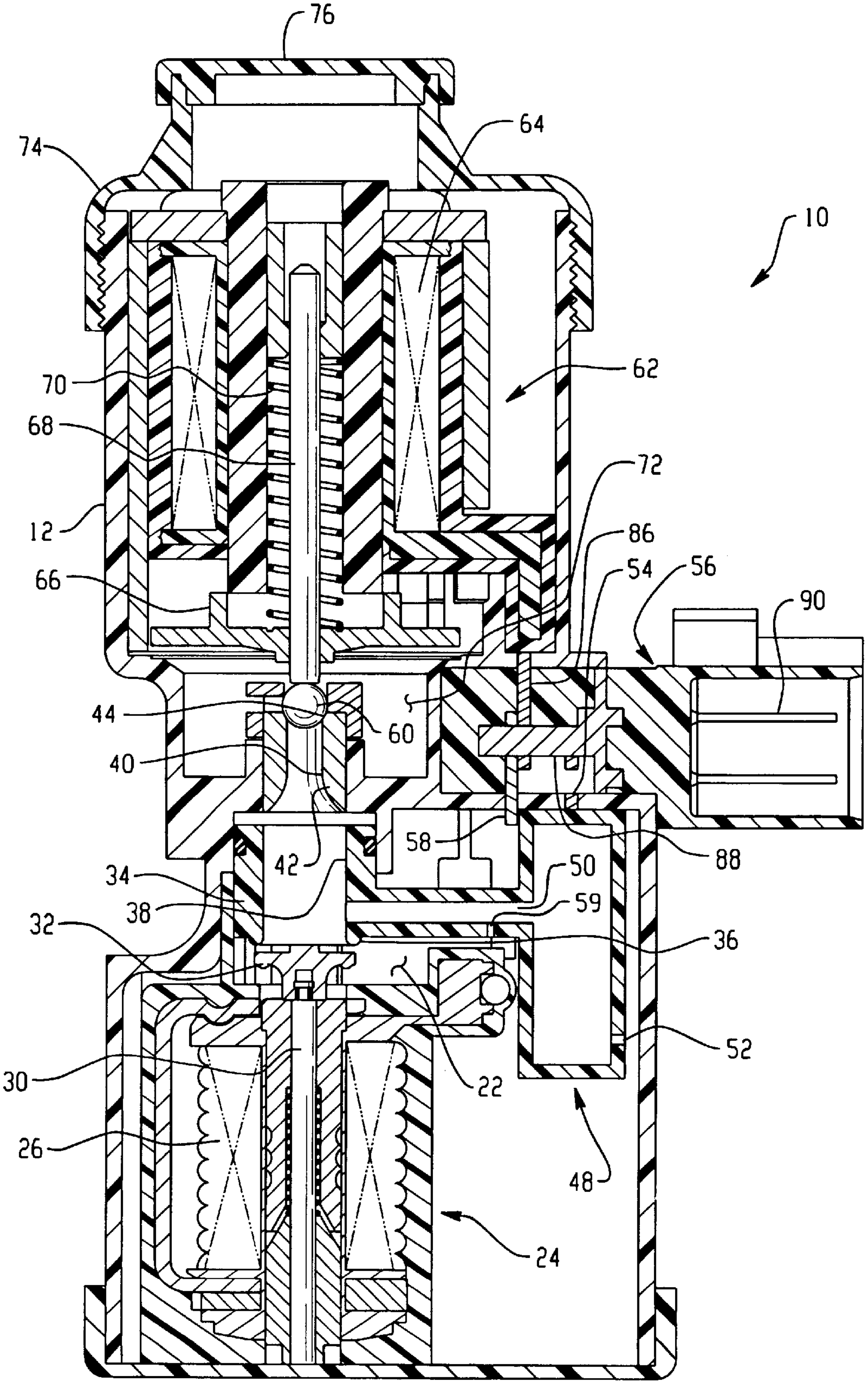
FIG. 3 is a section view taken along section indicating lines 3—3 of FIG. 1 and, FIG. 4 is an exploded view of the assembly of FIG. 1.
Figure 4:
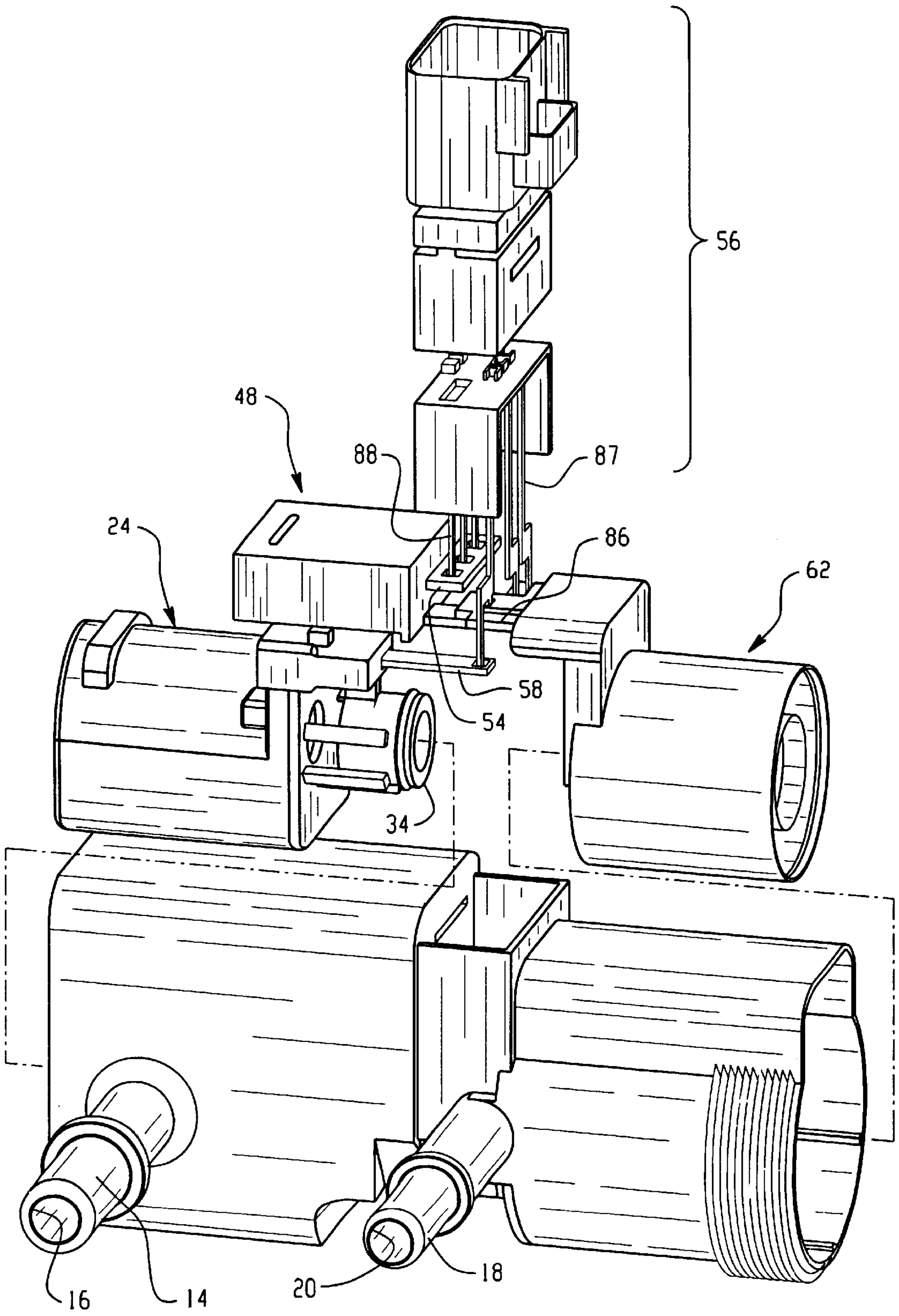

Referring to FIG. 3, a differential pressure transducer 48 is disposed in the body 12 with the casing or housing therefor formed integrally with the valve seat member 34; and, the transducer has a pressure tap or port 50 (see FIGS. 2 and 3) communicating with the passage 38; and, passage 50 communicates with chamber 22 through metering orifice 59. The pressure transducer is ported to the chamber 22 through port 52 provided thereon and has two electrical terminals 54 extending therefrom into the space reserved for an electrical receptacle indicated generally at 56 provided on the housing 12.

The coil 26 in valve 24 has two electrical terminals 58 provided therewith which also extends into the space reserved for receptacle 56 as shown in FIG. 3.

The valve seat 44 has a moveable obturator in the form of a spherical member 60 disposed for seating thereagainst; and, the valve housing 12 has a second solenoid operator indicated generally at 62 disposed therein. Solenoid operator 62 includes a coil 64 and moveable armature 66 which is operatively connected to an operating member or rod 68 which has an end thereof contacting the obturator 60. A spring 70 is disposed within the coil and serves to bias the armature 66 in a direction tending to urge the obturator 60 in contact with valve seat 44.

Housing 12 also defines therein a second valving chamber 72 which communicates the passage 40 and thus with the outlet passage 18 in the fitting 20. The solenoid operator 62 is retained and sealed in the cavity 72 by a collar 74 threadedly engaged over the upper end of body 12 and sealed by endcap 76 secured thereon preferably by weldment.

In operation, for canister purge flow of vapor to the engine air inlet, solenoid valve 24 is opened to permit full flow to valve 62 which controls flow to the outlet passage 20 which is connected to the engine air inlet. During leak testing valve 24 is closed and the pressure transducer senses flow due to leakage.

Optionally, a test fitting 78 may be formed on the lower end of the body 12 with a test port or passage 80 formed therein and for communicating with the valving chamber 22. A one-way check valve indicated generally at 82 may be disposed in the passage 80 to permit pressure testing. The test port 80 and check valve are preferably covered by a dust cap 84 threadedly received in the end of fitting 78.

Coil 64 has two electrical terminals 86 extending into the space reserved for receptacle 56 as the solenoid operator 62 is assembled in the body 12. It will be understood that in a similar manner as solenoid operator 24 is received in the body two electrical terminals 58 extend into the space reserved for receptacle 56. The receptacle 56 is then installed with terminals 87, 88, 89 engaging the terminals 58, 54, 86 in plug in arrangement to provide electrical connection from the receptacle pins 90 to the coils and transducer.

The present invention thus provides a combination assembly of a flow control valve, on/off valve and pressure transducer in a single body or housing for remotely controlling the venting and the leak testing of fuel vapor emission systems and is particularly suitable for being located remotely from the fuel tank of the motor vehicle.

Although the invention has hereinabove been described with respect to the illustrated embodiments, it will be understood that the invention is capable of modification and variation and is limited only by the following claims.

What is claimed is:

1. A method of making an electrically operated valve assembly with an integral pressure transducer comprising:

(a) forming a valve housing with a valving chamber having an inlet port with a passage communicating said chamber with a second valving chamber having an outlet port;

(b) disposing a pressure transducer in the housing and forming a first valve seat in said passage and porting the pressure transducer to said passage;

(c) disposing a first solenoid operated valve with a moveable obturator in said first chamber and disposing the obturator for movement with respect to said first valve seat; and, (d) forming a second valve seat in said passage downstream of said first passage and disposing a second solenoid operated valve in said second passage with an obturator for movement with respect to said second valve seat.

2. The method defined in claim 1, wherein said step of disposing said first valve seat in said passage includes inserting a valve seat member with a seal ring in said passage.

3. The method defined in claim 1, wherein said step of connecting said first and second solenoid valves and said transducer to said connector includes plugging in.

4. The method defined in claim 1, wherein said step of forming a housing includes forming a test port therein.

5. The method defined in claim 4, wherein said step of forming a test port includes disposing a one-way valve in the test port.

6. The method defined in claim 1, wherein said step of forming a housing and forming a connector includes molding plastic material.

7. The method defined in claim 1, wherein said step of disposing a first and second solenoid valve includes encapsulating a coil with plastic material.

8. The method defined in claim 1, wherein said step of porting said transducer to said passage includes forming said valve first seat in the inlet of said transducer.

9. The method defined in claim 1, further comprising forming a connector for external electrical connection on said housing and connecting said transducer and said first and second solenoid operated valves to said connector.

10. The method defined in claim 1, wherein said step of forming a valve housing includes forming the housing integrally as one-piece.

11. An electrically operated valve assembly with integral pressure transducer comprising:

(a) a valve housing defining a first valving chamber with an inlet port and a second valving chamber with an outlet port and a valving passage having a first valve seat controlling flow from said first chamber to said passage and a second valve seat controlling flow from said passage to said second chamber;

(b) a first solenoid operated valve disposed for movement with respect to said first valve seat for controlling flow thereover and a second solenoid operated valve disposed for movement with respect to said second valve seat; and (c) a pressure transducer disposed in said housing and ported to said passage for sensing pressure therein;

(d) means for effecting common external electrical connection to said first solenoid and said transducer.

12. The method defined in claim 11, wherein said valve housing is formed integrally as one-piece.

13. The assembly defined in claim 11, wherein said pressure transducer has a portion of said passage and said second valve seat formed integrally therewith.

14. The assembly defined in claim 11, wherein said pressure transducer includes said second valve seat formed integrally therewith and has a plug-in connection with said passage.

15. The assembly defined in claim 11, wherein said first and second solenoid operated valve includes an encapsulated coil each connected with a plug-in connection to said means for external electrical connection.

16. The assembly defined in claim 11, wherein said pressure transducer has a plug-in connection with said means for external electrical connection.

17. The assembly defined in claim 11, wherein said first and second solenoid operated valves are disposed in axially aligned arrangement and said means for external electrical connection is disposed at right angles to said solenoid axis.

18. The valve assembly defined in claim 11, wherein said housing includes a pressure test port communicating with said chamber.

19. The valve assembly defined in claim 18, wherein said pressure test port includes a one-way valve.

20. The valve assembly defined in claim 11, wherein said means for effecting common electrical connection is integrally formed therewith.

* * * * *